(12) United States Patent
Lepreux et al.

(10) Patent No.: US 11,267,543 B2
(45) Date of Patent: Mar. 8, 2022

(54) STABILISATION SYSTEM, IN PARTICULAR FOR A FLOATING SUPPORT, COMPRISING MULTIPLE U-SHAPED DAMPING DEVICES

(71) Applicant: IFP Energies nouvelles, Rueil-Malmaison (FR)

(72) Inventors: Olivier Lepreux, Lyons (FR); Christophe Coudurier, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 747 days.

(21) Appl. No.: 16/081,680

(22) PCT Filed: Feb. 2, 2017

(86) PCT No.: PCT/EP2017/052295
§ 371 (c)(1),
(2) Date: Aug. 31, 2018

(87) PCT Pub. No.: WO2017/148648
PCT Pub. Date: Sep. 8, 2017

(65) Prior Publication Data
US 2021/0221480 A1    Jul. 22, 2021

(30) Foreign Application Priority Data
Mar. 2, 2016 (FR) .................................. 1651745

(51) Int. Cl.
*B63B 39/00* (2006.01)
*F03D 13/25* (2016.01)
*B63B 35/44* (2006.01)

(52) U.S. Cl.
CPC .............. *B63B 39/00* (2013.01); *B63B 35/44* (2013.01); *F03D 13/25* (2016.05);
(Continued)

(58) Field of Classification Search
CPC ... B63B 39/00; B63B 35/44; B63B 2035/446; F03D 13/25; F05B 2240/93; F05B 2240/95
See application file for complete search history.

(56) References Cited

U.S. PATENT DOCUMENTS 3,606,851 A * 9/1971 Pengalila et al. ....... B63B 39/03
114/125
6,857,231 B2 * 2/2005 Chen .................... F16F 15/167
52/167.2

(Continued)

FOREIGN PATENT DOCUMENTS

EP        1677003 A2    7/2006
JP     2004-291702 A   10/2004
(Continued)

OTHER PUBLICATIONS

International Search Report for PCT/EP2017/052295, dated Mar. 1, 2017; English translation submitted herewith (6 pgs.).
(Continued)

*Primary Examiner* — Stephen P Avila
(74) *Attorney, Agent, or Firm* — Fitch, Even, Tabin & Flannery, LLP

(57) ABSTRACT

Stabilization system for a system subjected to external stresses, in particular for a floating support structure, the stabilization system comprising at least three damping devices (1), in form of U-shaped tubes, made up of liquid reserves (2) and a connecting tube (3). At least two of the damping devices are not parallel to one another. The invention further relates to a floating support structure comprising such a stabilization system.

12 Claims, 3 Drawing Sheets

(52) U.S. Cl.
CPC ..... *B63B 2035/446* (2013.01); *F05B 2240/93* (2013.01); *F05B 2240/95* (2013.01)

(56) References Cited

U.S. PATENT DOCUMENTS

2010/0200348 A1  8/2010  Reiterer et al.
2014/0339828 A1  11/2014  Peiffer et al.

FOREIGN PATENT DOCUMENTS

WO  2006/062390 A1  6/2006
WO  2009/043547 A1  4/2009

OTHER PUBLICATIONS

C.. Coudurier, O. Lepreux and N. Petit, Passive and semi-active control of an offshore floating wind turbine using a tuned liquid column damper, in Proc, of 10th IFAC Conference on Manoeuvring and Control of Marine Craft, MCMC, 2015.
Office Action dated Jun. 15, 2021 in counterpart JP Appln. No. 2018-545931.

\* cited by examiner

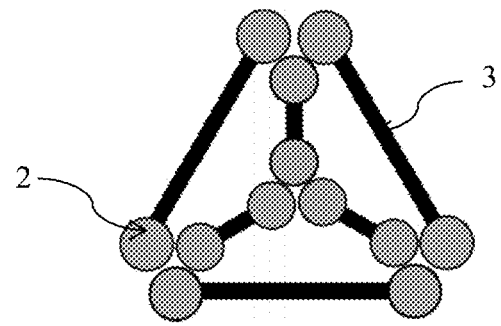
Figure 2e
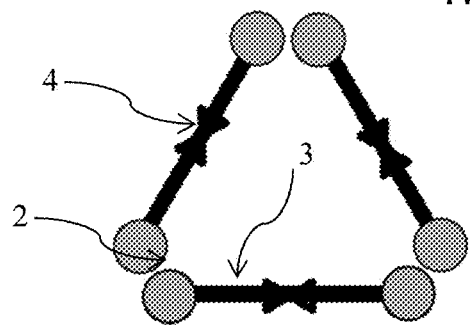 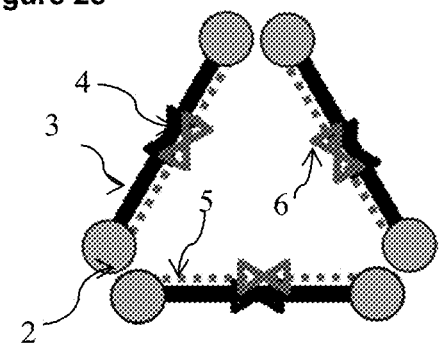
Figure 3a Figure 3b
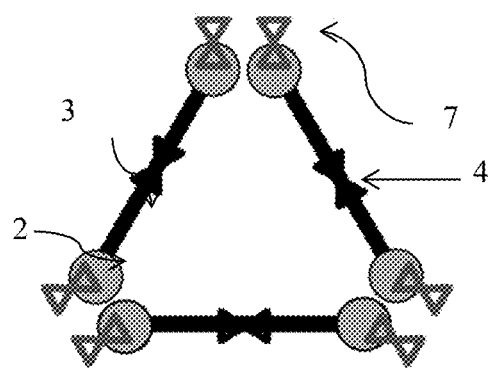 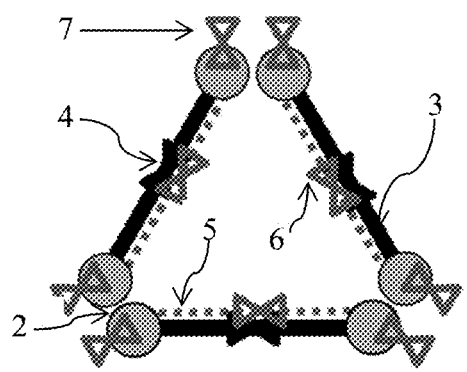
Figure 3c Figure 3d

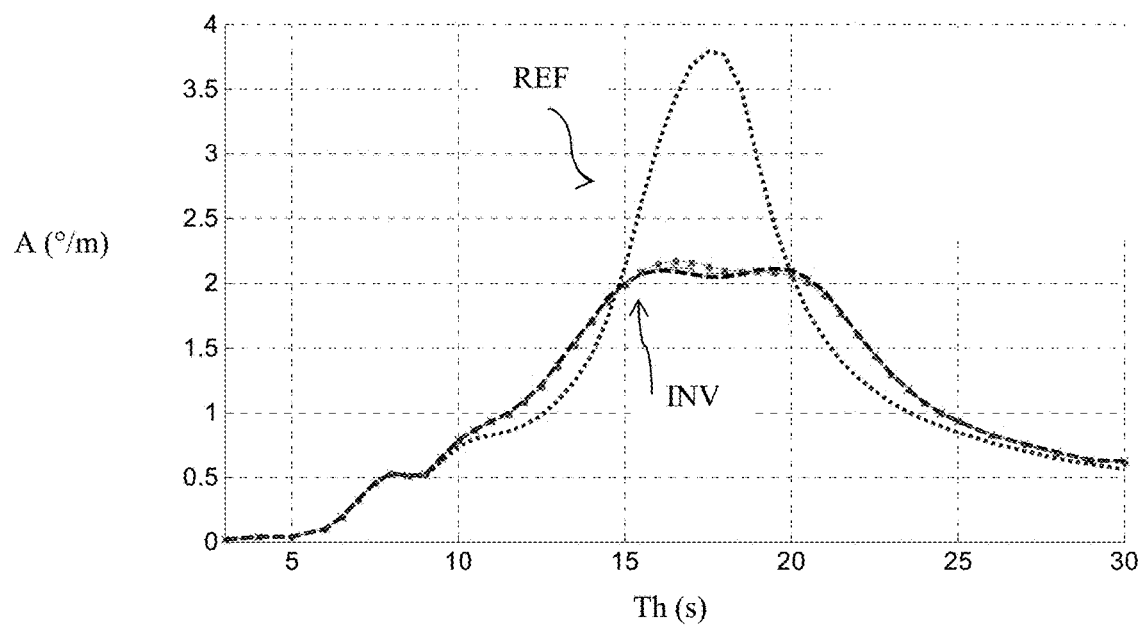
Figure 4
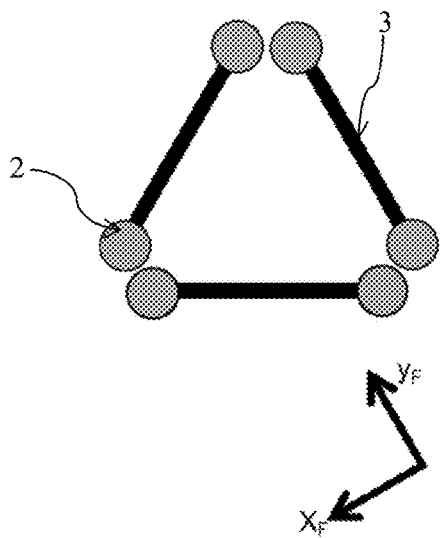
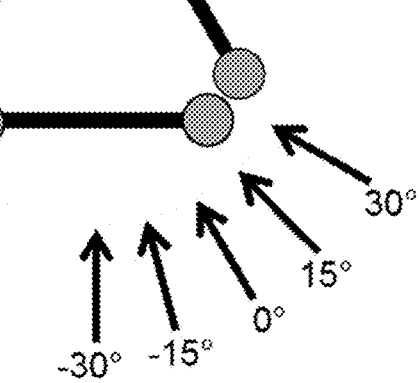
Figure 5a          Figure 5b

STABILISATION SYSTEM, IN PARTICULAR FOR A FLOATING SUPPORT, COMPRISING MULTIPLE U-SHAPED DAMPING DEVICES

CROSS-REFERENCE TO RELATED APPLICATIONS

This application is a U.S. national phase application filed under 35 U.S.C. § 371 of International Application No. PCT/EP2017/052295, filed Feb. 2, 2017, designating the United States, which claims priority from French Patent Application No. 16/51.745, filed Mar. 2, 2016, which are hereby incorporated herein by reference in their entirety.

FIELD OF THE INVENTION

The present invention relates to the field of offshore floating support structures, in particular for offshore wind turbines, the field of offshore bottom-fixed support structures, in particular for offshore bottom-fixed wind turbines, and the field of civil engineering, in particular for skyscrapers or bridges.

In the case of offshore wind turbines, the floating support structure supports, in the emerged part, the wind turbine made up of the blades, the rotor, the nacelle and the tower fastened onto the floating support. These floating supports can be anchored to the seabed by taut, semi-taut or catenary anchor lines. The purpose of the floating support is to provide wind turbine buoyancy and stability so as to take up the stresses exerted thereon while limiting motion of the assembly.

BACKGROUND OF THE INVENTION

Various floating support structures intended for installing offshore multi-megawatt wind turbines are currently under development in many countries. Depending on the depth of the site considered, several design options are possible. Despite their great diversity, several floating support families emerge, among which:

SPAR type floaters, characterized by a slender geometric shape and comprising significant ballast so as to lower the center of gravity of the whole structure to the maximum and thus to provide stability, barge type floaters are very wide shallow drafted support structures. Their stability is provided by their wide waterplane area. However, this type of support structure is very sensitive to wave motion, TLP (Tension Leg Platform) type support structures that have the specific feature of being moored to the seabed by taut cables providing structure stability, and semi-submersible type floaters are support structures consisting of at least three floaters connected by arms providing stiffness. These support structures generally have a low displacement and a great waterplane area inertia, thus providing sufficient righting moment for the stability thereof. Furthermore, this type of floater is less sensitive to wave motion than barges.

Floating support structures can also be used in other fields than offshore wind turbine installation (at sea), for example for hydrocarbon production means, wave energy conversion systems (for converting wave energy to mechanical or electrical energy), etc.

In order to enable damping of the motion caused by the waves, various damping solutions have been considered for these floaters.

According to a first solution, damping can be achieved using a ballast system with a "U-shaped tube" comprising a liquid that can move between the two vertical branches of the U. This solution is notably described in the following document:

C. Coudurier, O. Lepreux and N. Petit, Passive and semi-active control of an offshore floating wind turbine using a tuned liquid column damper, in Proc. of $10^{th}$ IFAC Conference on Manoeuvring and Control of Marine Craft, MCMC, 2015.

However, this solution only allows to damp the motion caused by the waves in a single direction. Indeed, for waves whose direction is not parallel to the "U-shaped tube", the motion is not damped. Now, at sea, the direction of the wave motion is variable with time, therefore the motion is not constantly parallel to the "U-shaped tube".

Besides, the stability problem also arises in other fields, for example for bottom-fixed structures (notably bottom-fixed wind turbines) that are subjected to stresses caused by the wave motion, as well as civil engineering structures (buildings, bridges) that may undergo stresses caused by the wind or by an earthquake.

The present invention thus relates to a stabilization system for a system subjected to external stresses, the stabilization system comprising at least three damping devices in form of U-shaped tubes, made up of liquid reserves and a connecting tube. At least two of the damping devices are not parallel to one another. It is thus possible to damp wave motion excitations, whatever the direction of the wave motion.

SUMMARY OF THE INVENTION

The invention relates to a stabilization system for a floating support structure, comprising a plurality of damping devices, each damping device being substantially U-shaped and being made up of two liquid reserves and one connecting tube connecting said two liquid reserves. Said stabilization system comprises at least three damping devices, each damping device being not parallel to at least one other damping device.

According to an embodiment of the invention, said damping devices are so arranged as to form a star and/or a polygon, preferably a regular polygon, the vertices of said star or of said polygon being formed by said liquid reserves of said damping devices, and the edges of said star or of said polygon being formed by said connecting tubes of said damping devices.

Advantageously, said vertices of said polygon are formed by at least two liquid reserves of two distinct damping devices.

According to a variant embodiment, the centre of said star is formed by a crossing of at least two connecting tubes of two distinct damping devices, or at least two liquid reserves of two distinct damping devices (1).

According to an implementation, a connecting tube of at least one damping device comprises means for restricting passage of said liquid.

According to a characteristic, said liquid reserves of at least one damping device comprise a gas in the upper parts thereof.

Preferably, at least one damping device comprises a line allowing passage of said gas and connecting said two liquid reserves.

Advantageously, said line allowing passage of said gas is parallel to said connecting tube.

According to a variant, said line allowing passage of said gas comprises means for restricting passage of said gas.

According to a design, at least one liquid reserve comprises a connection with a gas from the outside medium.

According to an embodiment, said liquid reserves have a substantially cylindrical shape.

According to an embodiment of the invention, said stabilization system comprises between three and eight damping devices.

Furthermore, the invention relates to a floating support structure comprising at least one floater and a stabilization system according to one of the above characteristics.

Advantageously, said floating support structure comprises at least three floaters, each floater comprising at least one liquid reserve of a damping device.

According to an embodiment, each floater comprises at least two liquid reserves of two distinct damping devices (1).

Furthermore, the invention relates to an offshore energy production system comprising at least a wind turbine and a floating support structure according to one of the above features.

BRIEF DESCRIPTION OF THE FIGURES

Other features and advantages of the system according to the invention will be clear from reading the description hereafter of embodiments given by way of non-limitative example, with reference to the accompanying figures wherein:

FIGS. 2*a* to 2*e* illustrate various embodiments of a stabilization system according to the invention, FIGS. 3*a* to 3*d* illustrate different variants of the embodiment of FIG. 2*a*, FIG. 4 is a curve showing the displacement amplitude of a floater for a system according to the prior art and for a floater according to the invention, for various incidence angles of the wave motion, and FIGS. 5*a* and 5*b* illustrate the wave motion orientation for the example of FIG. 4.

DETAILED DESCRIPTION OF THE INVENTION

Figure 1:
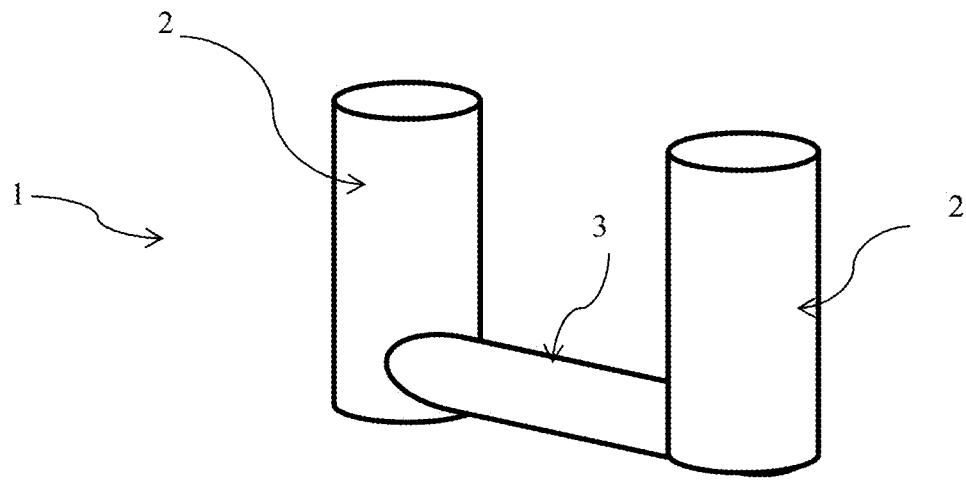
FIG. 1 illustrates a damping device according to an embodiment of the invention.

The present invention relates to a stabilization system for a system likely to be subjected to external stresses. The stabilization system comprises a plurality of damping devices. Each damping system consists of a "U-shaped tube" and thus allows the wave excitation to be damped in a direction. Each damping system comprises two liquid reserves, arranged in the vertical branches of the "U", and a connecting tube connecting the two liquid reserves, arranged at the base of the "U". Preferably, the connecting tube is substantially horizontal. Thus, within a damping device, the liquid can freely flow, in a dynamic manner (i.e. without being controlled and without external energy supply), from a first reserve to the second reserve of the damping device. The "U-shaped tube" can be considered substantially two-dimensional, i.e. contained in a plane formed by the axes of the liquid reserves and by the axis of the connecting tube. FIG. 1 schematically illustrates, by way of non-limitative example, a damping system according to the invention. Damping system 1 comprises two liquid reserves 2, connected at the base thereof by a connecting tube 3. In this figure, the various elements are shown substantially cylindrical; however, they may have different shapes.

The system that may be subjected to stresses can be a floating support undergoing stresses caused by the wave motion. The system can also be a bottom-fixed structure subjected to stresses caused by the wave motion. Alternatively, this system can be a civil engineering structure: a building, a bridge, etc., subjected to stresses caused by the wind or an earthquake. In the description, only the case of a floating support structure is mentioned, but the different stabilization system variants described are suited for any type of system undergoing external stresses.

According to the invention, the stabilization system comprises at least three damping devices, each damping device being not parallel to at least one other damping device of the stabilization system, i.e. at least two damping devices of the stabilization system are not parallel. In other words, the damping devices are not all parallel (which would correspond, in top view, to an alignment of the damping systems or a parallelism of the connecting tubes). The parallelism is considered from the planes formed by the axes of the liquid reserves and the axis of the connecting tube for each damping device (plane of the "U-shaped tube"). The connecting tubes connect the liquid reserves, thus allowing free and dynamic circulation of the liquid between the liquid reserves in at least one of the damping devices, according to the direction of the wave motion. This non-parallel and therefore three-dimensional distribution allows the movements of the floating support to be damped for all the wave motion directions. This specific feature allows multi-directional damping to be optimized by means of a dynamic system enabling dynamic stress damping. Furthermore, this feature allows easy adaptation to the floating support geometry. Selecting at least three damping devices allows to guarantee multi-directional damping, which is not obtained with one "U-shaped tube" and is not very efficient with two "U-shaped tubes".

Advantageously, the liquid used is water, sea water for example. However, the liquid can be of any type, in particular a liquid that pollutes little or not the water of the ambient medium in case of leakage.

The connecting tubes can be advantageously located in the lower part (at the base) of the liquid reserves, so as to promote displacement of the liquid between the liquid reserves of a damping device.

Furthermore, the connecting tubes can be substantially horizontal, thus limiting displacement of the liquid through gravity.

In the rest of the description below and in the claims, the terms waves, wave forces and wave motion are considered to be equivalent.

According to an embodiment of the invention, the layout of the damping devices can form a star or a polygon. In this case, liquid reserves form the vertices of the star or of the polygon, and the connecting tubes form the edges of the star or of the polygon. Selecting a polygon or a star is notably done in order to adapt to the architecture of the floating support structure. Typically, for a semi-submersible type floating support, one can ensure that the reserves are located at the floaters of the semi-submersible structure and that the connecting tubes are supported by the arms connecting the floaters. Since these arms can come in form of a star or of a polygon, the stabilization system can be adapted accordingly.

The "star shape" design allows shorter connecting tubes to be used. The "polygon shape" design allows easier design by avoiding connections between connecting tubes.

For example, the star can have from three to six branches. The centre of the star can correspond to the point where the connecting tubes of the various damping devices cross, without any connection between the connecting tubes.

Besides, the star can have a set of liquid reserves in the centre thereof. Thus, each branch of the star corresponds to a damping device.

When the connecting tubes form a polygon, the polygon is preferably a regular polygon, thus allowing balanced distribution of the liquid promoting three-dimensional damping of the floating support. For example, the stabilization system can comprise three damping devices, arranged in a triangle, preferably an equilateral triangle: two neighbouring liquid reserves belonging to two distinct damping devices are arranged at the vertices of the triangle. According to another example, the stabilization system can comprise four damping devices forming a quadrilateral, preferably a rhombus, and more preferably a square: two neighbouring liquid reserves belonging to two distinct damping devices are arranged at the vertices of the quadrilateral. The polygon can also be a pentagon, a hexagon, an octagon, etc.

The layout of the damping devices can also combine a polygon and a star. In this case, the vertices of the star can correspond to the vertex of the polygon.

According to an implementation of the invention, at least one connecting tube can be made of steel, composite, plastic, concrete or any similar material.

According to an embodiment of the invention, a connecting tube of at least one damping device and preferably all the connecting tubes of all the damping device comprise liquid passage restriction means. The liquid passage restriction means allow to slow down the free stream flowing therethrough, so as to optimize the damping provided by the stabilizing system. These liquid passage restriction means can be passive or active. Active restriction means allow the damping performances to be improved. The purpose of active restriction means is not to cause displacement of the liquid; on the contrary, the sole purpose thereof is to hinder/partly limit free circulation of the liquid. The restriction means can consist for example of a local tube diameter reduction, a valve, pumps or compressors, etc. Adjustment of this restriction allows to adjust certain characteristics of the damping system.

The liquid reserves can have various shapes. Thus, they can be suited to different floating support shapes. According to a preferred design of the invention, the liquid reserves have a substantially cylindrical shape. The liquid reserves can then be referred to as columns.

According to an implementation of the invention, at least one liquid reserve can be made of steel, composite, plastic, concrete or any similar material.

According to an implementation of the invention, the lower part of the liquid reserves comprises the liquid and the upper part comprises a gas, notably air. According to a first design, the liquid reserves can freely exchange gas with the outside medium.

For this implementation (with gas in the upper part), the stabilization system can comprise gas passage lines connecting the liquid reserves of a damping device. The liquid reserves can then be isolated from the outside air, so that an overpressure in one liquid reserve causes a gas stream to flow towards the other liquid reserve of the damping device, through a gas passage line. Advantageously, the gas passage lines are located in the upper part of the liquid reserves. The gas passage lines can be parallel to the connecting tubes. The parallel configuration allows to limit the size of the stabilization system.

According to a characteristic, a gas passage line of at least one damping device can comprise gas passage restriction means. Preferably, all the gas passage lines can comprise gas passage restriction means. The gas passage restriction means allow to limit the flow of gas from one liquid reserve to another. These gas passage restriction means can be passive or active. The purpose of active restriction means is not to cause displacement of the gas; on the contrary, the sole purpose thereof is to hinder/partly limit free circulation of the gas. Active restriction means allow the damping performances to be improved. The gas passage restriction means can consist for example of a local tube diameter reduction, a valve, pumps or compressors. Adjustment of this restriction allows to adjust certain characteristics related to the stabilization system damping.

Furthermore, alternatively or additionally to the gas passage lines, at least one liquid reserve can comprise a connection with the outside medium, allowing passage of air from the outside medium to the upper part of the liquid reserve and vice versa. Thus, an overpressure in a liquid reserve generates a gas flow towards the outside. This connection can be a restriction. Adjustment of this overpressure allows to adjust certain characteristics related to the stabilization system damping.

The dimensions of the connecting tubes and of the liquid reserves depend on the dimension of the floating support. One may want to arrange the water reserves as far as possible in the floating support, and the connecting tubes are adapted accordingly. For example, for a 36-m diameter circular barge, in a three-angled polygon configuration, connecting tubes approximately 30 m in length, 1.5 m in diameter, liquid reserves 5 to 10 m in height and 3 m in diameter can be used. Typically, a total mass of liquid (contained in the liquid reserves and the connecting tubes) of the order of 5% to 15% of the mass of the floating support can be used. The concept however works at all scales.

FIGS. 2a to 2e illustrate in top view, by way of non-limitative example, various embodiments of the stabilization system according to the invention. In these figures, only the main elements are represented. However, these embodiments are compatible with the use of gas passage lines, liquid passage restriction means, gas passage restriction means, connections with the outside medium, etc.

Figure 2A:
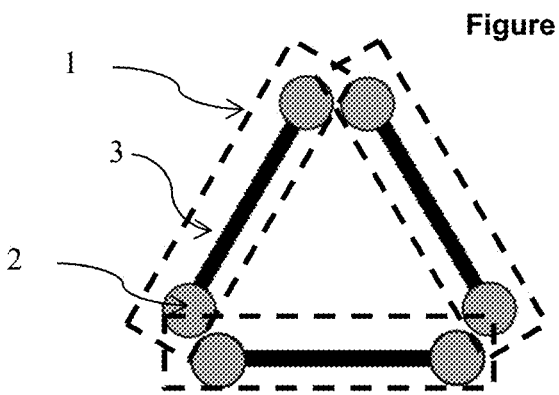

The stabilization system according to the embodiment of FIG. 2a comprises three damping devices arranged in a triangle. In the case illustrated, it is an equilateral triangle. Each damping device comprises two liquid reserves 2 and one connecting tube 3. Liquid reserves 2 have a substantially cylindrical shape. Each connecting tube 3 connects two liquid reserves 2. Connecting tubes 3 are arranged in the lower part of the liquid reserves. Two neighbouring liquid reserves 2 belonging to two distinct damping devices are arranged at each vertex of the triangle. This configuration is notably suited to a tri-floater type floating support, where each floater comprises a triangle vertex, i.e. two neighbouring liquid reserves 2 belonging to two distinct damping devices. The damping devices are so arranged as to form an angle of approximately 60° in order to form the equilateral triangle. Thus, two adjacent damping devices at one angle of the triangle are not parallel to one another. This variant embodiment is also suited for a floating support with a single floater, this single floater comprising the entire stabilization system.

Figure 2B:
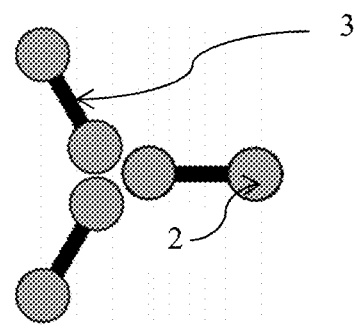

The stabilization system according to the embodiment of FIG. 2b comprises three damping devices 1 arranged in form of a star with three branches. Each branch of the star is formed by a damping device 1: the centre of the star is formed by three liquid reserves close to one another, the liquid reserves belonging to distinct damping devices. The damping devices are arranged so as to form an angle of approximately 120°, to form the star. Thus, two adjacent devices at the centre of the star are not parallel to one another. Each damping device 1 comprises two liquid reserves 2 and one connecting tube 3. Liquid reserves 2 have a substantially cylindrical shape. Each connecting tube 3 connects two liquid reserves 2. Connecting tubes 3 are located in the lower part of the liquid reserves. This arrangement is suited notably to a tri-floater type floating support where each floater comprises a vertex of the star. This variant embodiment is also suited for a floating support with a single floater, this single floater comprising the entire stabilization system.

Figure 2C:
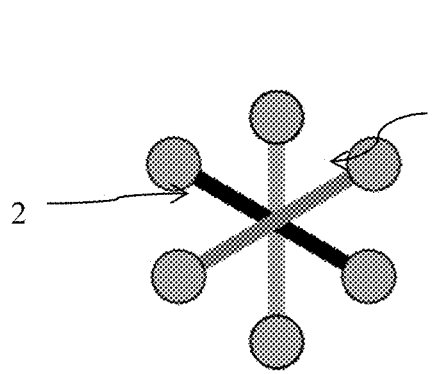

The stabilization system according to the embodiment of FIG. 2c comprises three damping devices 1 arranged in form of a star with six branches. Each damping device 1 comprises two liquid reserves 2 and one connecting tube 3. Liquid reserves 2 have a substantially cylindrical shape. Each connecting tube 3 connects two liquid reserves 2. The centre of the star is formed by the crossing of connecting tubes 3. In the centre of the star, the connecting tubes are not connected to one another, but they can be superposed one above the other. The damping devices are so arranged as to form an angle of approximately 60°, to form the star. Thus, two adjacent damping devices at the centre of the star are not parallel to one another. Connecting tubes 3 are located in the lower part of the liquid reserves. This arrangement is notably suited to a tri-floater type floating support where each floater comprises a vertex of the star. This variant embodiment is also suited for a floating support with a single floater, this single floater comprising the entire stabilization system.

Figure 2D:
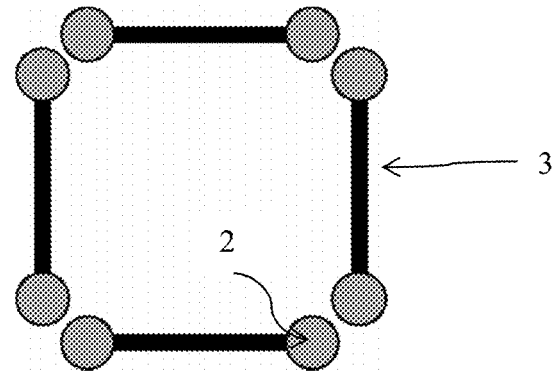

The stabilization system according to the embodiment of FIG. 2d comprises four damping devices 1 arranged as a quadrilateral. In the case illustrated, it is a square. Each damping device comprises two liquid reserves 2 and one connecting tube 3. Liquid reserves 2 have a substantially cylindrical shape. Each connecting tube 3 connects two liquid reserves 2. Connecting tubes 3 are located in the lower part of the liquid reserves. Two neighbouring liquid reserves belonging to two distinct damping devices are arranged at each vertex of the square. The damping devices are so arranged as to form an angle of approximately 90°, to form the square. Thus, two adjacent damping devices at an angle of the square are not parallel to one another. This arrangement is notably suited to a quadri-floater type floating support where each floater comprises a vertex of the square, i.e. two liquid reserves 2 of two distinct damping devices. This variant embodiment is also suited for a floating support with a single floater, this single floater comprising the entire stabilization system.

The stabilization system according to the embodiment of FIG. 2e comprises six damping devices 1, three being arranged in a triangle and three in a star. In the case illustrated, it is an equilateral triangle in which the star is inscribed. Each branch of the star is formed by a damping device 1: the centre of the star is formed by three liquid reserves close to one another, the liquid reserves belonging to distinct and neighbouring damping devices. The damping devices of the star are so arranged as to form an angle of approximately 120°, to form the star. Thus, two adjacent damping devices at the centre of the star are not parallel to one another. The outer ends of the branches of the star are next to the vertices of the triangle. Three neighbouring liquid reserves 2 belonging to three distinct damping devices are arranged at each vertex of the triangle. The damping devices of the triangle are so arranged as to form an angle of approximately 60°, to form the equilateral triangle. Thus, two adjacent damping devices at an angle of the triangle are not parallel to one another. Each damping device comprises two liquid reserves 2 and one connecting tube 3. Liquid reserves 2 have a substantially cylindrical shape. Each connecting tube 3 connects two liquid reserves 2. Connecting tubes 3 are located in the lower part of the liquid reserves. This arrangement is notably suited to a tri-floater type floating support with an additional central floater, where each floater comprises a vertex of the triangle, i.e. three liquid reserves 2 of three distinct damping devices, where the central floater comprises the centre of the star, i.e. three liquid reserves 2 of three distinct damping devices. This variant embodiment is also suited for a floating support with a single floater, this single floater comprising the entire stabilization system.

Other embodiments may also be considered, notably an arrangement of the damping devices forming a square and a star with four branches, or an arrangement forming a pentagon and a star with five branches.

FIGS. 3a to 3d schematically show in top view, by way of non-limitative example, four variants of the first embodiment corresponding to FIG. 2a, i.e. with three damping devices arranged in a triangle.

The stabilization system according to the variant embodiment of FIG. 3a comprises, in addition to the elements illustrated in FIG. 2a, liquid restriction means 4. Liquid passage restriction means 4 are provided on each connecting tube 3. They allow to reduce the flow of liquid passing through connecting tubes 3.

The stabilization system according to the variant embodiment of FIG. 3b comprises, in addition to the elements illustrated in FIG. 2a, gas passage lines 5 (in dotted line) and gas passage restriction means 6. Gas passage lines 5 connect the upper part of liquid reserves 2 for gas passage from one liquid reserve to another. For this variant, gas passage lines 5 are parallel to connecting tubes 3. Besides, each gas passage line 5 comprises gas passage restriction means 6. They allow to limit the flow of gas between liquid reserves 2. However, these gas passage restriction means 6 are optional.

The stabilization system according to the variant embodiment of FIG. 3c comprises, in addition to the elements illustrated in FIG. 2a, liquid restriction means 4 and connections 7 with the outside medium. Liquid restriction means 4 are provided on each connecting tube 3. They allow to reduce the flow of liquid passing through connecting tubes 3. Connections 7, in form of restrictions, allow passage of the gas from the outside medium to the upper part of liquid reserves 2 and vice versa. This variant can further comprise gas passage means (not shown).

The stabilization system according to the variant embodiment of FIG. 3d comprises, in addition to the elements illustrated in FIG. 2a, gas passage lines 5 (in dotted line), gas passage restriction means 6, liquid restriction means 4 and connections 7 with the outside medium. Liquid passage restriction means 4 are provided on each connecting tube 3. They allow to reduce the flow of liquid passing through connecting tubes 3. Connections 7, in form of restrictions, allow passage of the gas from the outside medium to the upper part of liquid reserves 2 and vice versa. Gas passage lines 5 connect the upper part of liquid reserves 2 for gas passage from one liquid reserve to another. For this variant, gas passage lines 5 are parallel to connecting tubes 3. Besides, each gas passage line 5 comprises gas passage restriction means 6. They allow to limit the flow of gas between liquid reserves 2. However, these gas passage restriction means 6 are optional.

These variant embodiments can be modified in order to be suited to the various concepts: notably, the arrangements of FIGS. 3b to 3d may comprise no liquid passage restriction means.

Besides, these various configurations can be applied to the various embodiments, in particular for the embodiments of FIGS. 2b to 2e.

Furthermore, the present invention relates to a floating support structure. The floating support comprises a stabilization system according to any one of the variant combinations described above. The stabilization system allows to damp the multidirectional motion of the waves for the floating support.

The floating support structure can have a single floater of substantially cylindrical shape, as described in patent application FR-2,998,338 for example. In this case, the stabilization system can be included in the single floater.

Alternatively, the floating support structure can have a plurality of floaters, preferably at least three, connected to one another. It can notably be of tri-floater type, as described in patent application FR-2,990,005 (US-2015/0,071,779). This design with several floaters generally has a low displacement and a great waterplane area inertia, thus providing sufficient righting moment for the stability thereof. Furthermore, this type of floater is less sensitive to wave motion than barges. In case of a plurality of floaters, each floater can comprise one or more liquid reserves of the stabilization system, and the connecting tubes of the stabilization system can then connect the various floaters with one another and they can be supported by the structure of the multi-floater floating support.

These floating supports can be anchored to the seabed by taut, semi-taut or catenary anchor lines.

The present invention also relates to a wind turbine installation on a stretch of water (sea for example). The installation comprises a vertical-axis or horizontal-axis wind turbine and a floating support according to any one of the variant combinations described above. The purpose of the floating support is to provide wind turbine buoyancy and stability so as to take up the stresses exerted thereon while limiting motion of the assembly. The floating support according to the invention is particularly well suited for installing an offshore wind turbine (at sea) in order to provide wave motion damping and wind turbine stability.

The floating support according to the invention can also be used in other fields than offshore wind turbine installation (at sea), for example for hydrocarbon production means, wave energy conversion systems (for converting the energy of waves to mechanical or electrical energy), etc.

EXAMPLE

To evaluate the performances of a floating support (floater) provided with a stabilization system according to the invention, we can describe on the one hand the interactions between the latter and the floater and, on the other hand, the interactions between the floater and the wave motion. A Lagrangian approach is used to obtain the equations of motion, whose general form is given by:

$$\frac{d}{dt}\frac{\partial L}{\partial q'_k} - \frac{\partial L}{\partial q_k} = Q_k$$

where L s the Langrangian of the system consisting of the floater and the stabilization system, $q_k$ the parameters of the system and $Q_k$ the generalized farces.

With this example, we show the multidirectional character of the stabilization system according to the invention. We therefore evaluate the response of a floater provided with a stabilization system according to the invention as illustrated in FIG. 1, for various incidence angles of the wave motion. A local reference frame is associated with each incidence angle, as defined in FIG. 5a. Whatever the incidence angle, the movements of the floater are evaluated in the local reference frame of the incident wave motion (therefore of the excitation), notably in terms of angular motion amplitude in the direction perpendicular to the incident wave (along $x_F$).

The results are given in FIG. 4 using the MIT barge as the floater (as described in the document: J. M. Jonkman, Dynamics modeling and loads analysis of an offshore floating wind turbine, PhD Thesis NREL/TP-500-41958, National Renewable Energy Laboratory, November 2007). FIG. 4 comprises curves of ratio A (°/m) of the angular amplitude to the wave height as a function of the wave period Th (s). This floater being circular, by symmetry, its response without a damping device, i.e. according to the prior art, is identical whatever the incidence angle. This response is given by curve REF. To evaluate the response sensitivity of the floater provided with the stabilization system according to the invention to the wave incidence angle, this angle is varied by 15° intervals between −30° and +30° (see FIG. 5b). The "equilateral triangle-shaped" support according to the invention being itself invariant by 120° rotation and symmetrical, this 60° scan is equivalent to a 360° scan of the incidence angle. The curves (one for each wave incidence angle of the wave motion) obtained for the system according to the invention are denoted by INV. These curves nearly merge. In relation to reference REF according to the prior art, using the stabilization system according to the invention INV allows a very significant decrease (about 40%) in the motion amplitude to be obtained over a wide range of excitation periods, as it is the case for a barge provided with a simple "U-shaped tube" arranged in the incidence plane of the waves. Furthermore, by superposing the curves, a very low sensitivity to the incidence angle can be seen. We can therefore say that the stabilization system according to the invention has a multidirectional character for damping. A contrario, a system with a simple "U-shaped tube" allows no damping for a wave motion whose incidence angle is perpendicular to the axis of the "U-shaped tube".

The invention claimed is:

1. A floating support structure comprising a single floater and a stabilization system included in the single floater for damping wave excitations, the stabilization system comprising a plurality of damping devices, each damping device being substantially U-shaped and being made up of two liquid reserves and a connecting tube connecting the two liquid reserves at the lower part of the liquid reserves allowing free and dynamic circulation of the liquid between the liquid reserves, wherein the stabilization system comprises at least three damping devices, each damping device being not parallel to at least one other damping device, wherein the at least three damping devices comprise:

three damping devices forming a three-branch star shaped support structure in which each branch of the star shaped support structure is formed by a damping device, a center of the star being formed by three liquid reserves close to one another, the liquid reserves belonging to distinct damping devices and/or three damping devices forming a triangular shaped support structure in which two neighboring liquid reserves belonging to two distinct damping devices are arranged at each vertex of the triangular shaped support structure.

2. The floating support structure as claimed in claim 1, wherein a connecting tube of at least one damping device comprises means for restricting passage of the liquid.

3. The floating support structure as claimed in claim 1, wherein the liquid reserves of at least one damping device comprise a gas in the upper parts thereof.

4. The floating support structure as claimed in claim 3, wherein at least one damping device comprises a line allowing passage of the gas and connecting the two liquid reserves.

5. The floating support structure as claimed in claim 3, wherein the line allowing passage of the gas is parallel to the connecting tube.

6. The floating support structure as claimed in claim 3, wherein the line allowing passage of the gas comprises means for restricting passage of the gas.

7. The floating support structure as claimed in claim 3, wherein at least one liquid reserve comprises a connection with a gas from the outside medium.

8. The floating support structure as claimed in claim 1, wherein the liquid reserves have a substantially cylindrical shape.

9. An offshore energy production system comprising at least a wind turbine and the floating support structure as claimed in claim 1.

10. The floating support structure as claimed in claim 1, wherein three damping devices form a three-branch star shaped support structure in which each branch of the star shaped support structure is formed by a damping device, a center of the star being formed by three liquid reserves close to one another, the liquid reserves belonging to distinct damping devices.

11. The floating support structure as claimed in claim 1, wherein three damping devices form a triangular shaped support structure in which two neighboring liquid reserves belonging to two distinct damping devices are arranged at each vertex of the triangular shaped support structure.

12. The floating support structure as claimed in claim 1, wherein three damping devices form a triangular shaped support structure in which two neighboring liquid reserves belonging to two distinct damping devices are arranged at each vertex of the triangular shaped support structure, and three additional damping devices form a three-branch star shaped support structure inscribed in the triangular shaped support structure and in which each branch of the star shaped support structure is formed by a damping device, a center of the star being formed by three liquid reserves close to one another, the liquid reserves belonging to distinct damping devices.

* * * * *